A. SHEARER & L. KIRLIN.
COMBINED LISTER PLOW AND PLANTER.
APPLICATION FILED FEB. 14, 1905.

936,483.

Patented Oct. 12, 1909.
4 SHEETS—SHEET 1.

A. SHEARER & L. KIRLIN.
COMBINED LISTER PLOW AND PLANTER.
APPLICATION FILED FEB. 14, 1905.

936,483.

Patented Oct. 12, 1909.
4 SHEETS—SHEET 2.

Witnesses
F. P. Glore.
H. C. Rodgers

Inventors:
Andrew Shearer and Linden Kirlin
By George H. Thorp
Atty.

A. SHEARER & L. KIRLIN.
COMBINED LISTER PLOW AND PLANTER.
APPLICATION FILED FEB. 14, 1905.
936,483.
Patented Oct. 12, 1909.
4 SHEETS—SHEET 3.
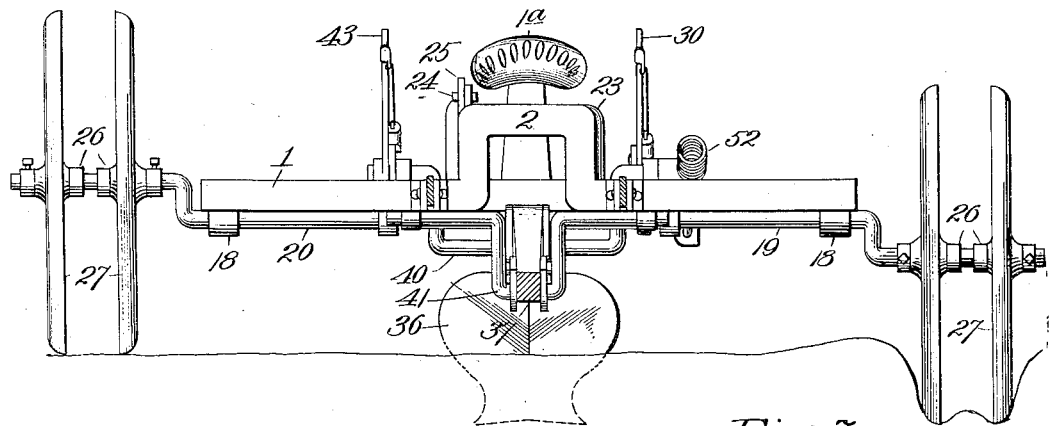
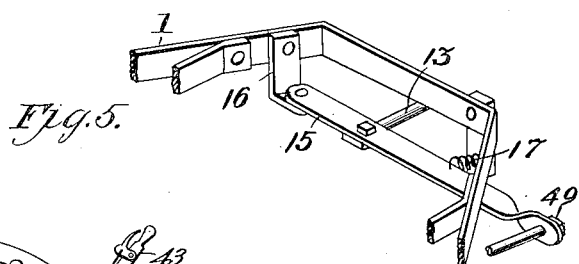
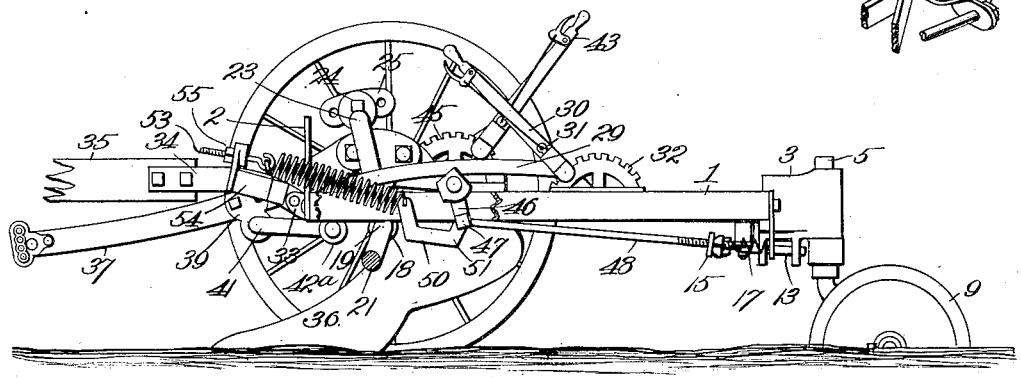
Witnesses
F. R. Glore
H. C. Rodgers
Inventors:
Andrew Shearer & Linden Kirlin.
By George H. Thorp
atty

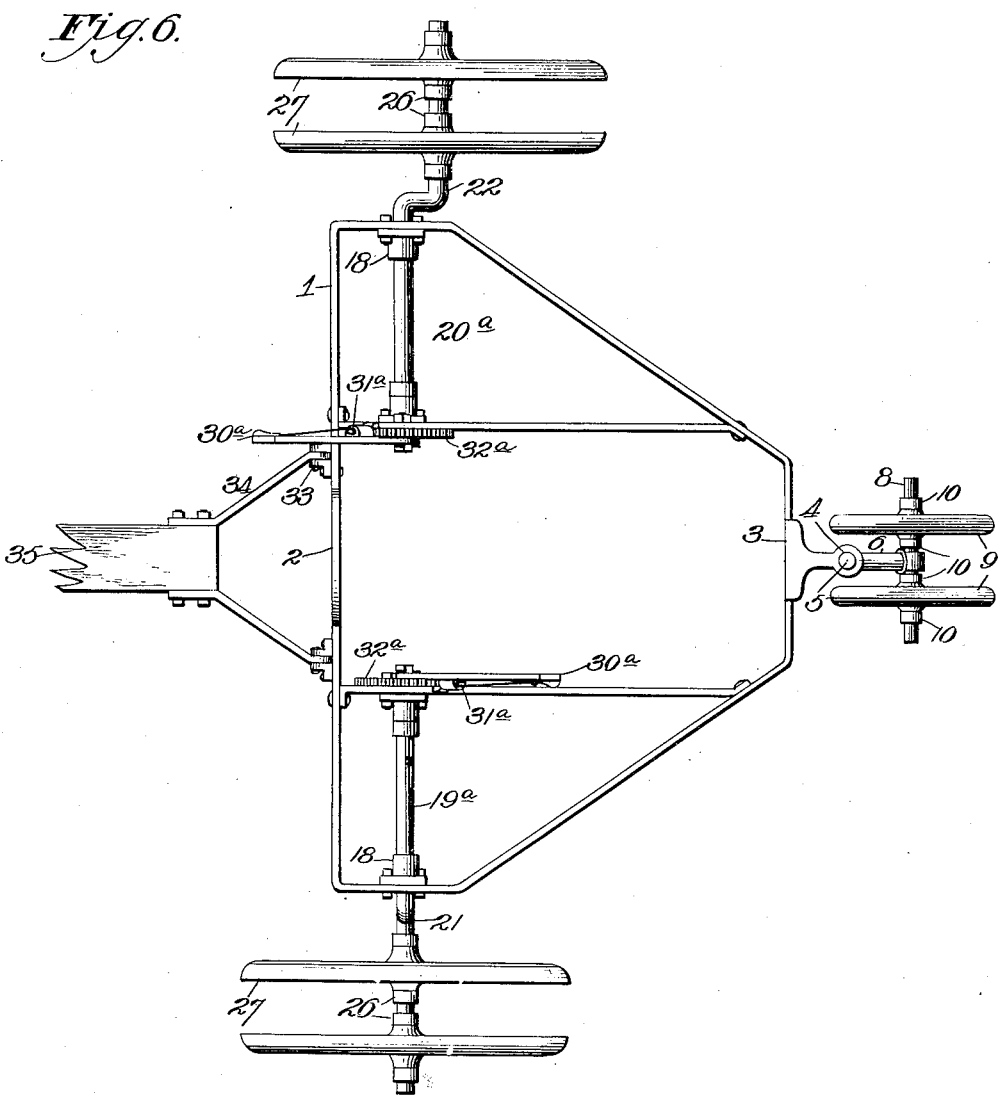

UNITED STATES PATENT OFFICE.

ANDREW SHEARER, OF FRANKFORT, KANSAS, AND LINDEN KIRLIN, OF KANSAS CITY, MISSOURI.

COMBINED LISTER-PLOW AND PLANTER.

936,483.          Specification of Letters Patent.      Patented Oct. 12, 1909.

Application filed February 14, 1905. Serial No. 245,601.

To all whom it may concern:

Be it known that we, ANDREW SHEARER and LINDEN KIRLIN, citizens of the United States, residing, respectively, at Frankfort, Marshall county, Kansas, and Kansas City, Jackson county, Missouri, have invented certain new and useful Improvements in Combined Lister-Plows and Planters, of which the following is a specification.

Our invention relates to combined lister plows and planters and has for its object to produce a machine by which can be made, straight parallel rows at equal distances apart.

A further object is to produce a machine of the character named which operates efficiently, is of light draft and of simple, strong, durable, and comparatively inexpensive construction.

With the objects in view named and others of a tributary character, as will hereinafter appear, the invention consists in certain novel and peculiar features of construction and organization as hereinafter described and claimed; and in order that it may be fully understood reference is to be had to the accompanying drawings, in which—

Figure 1:
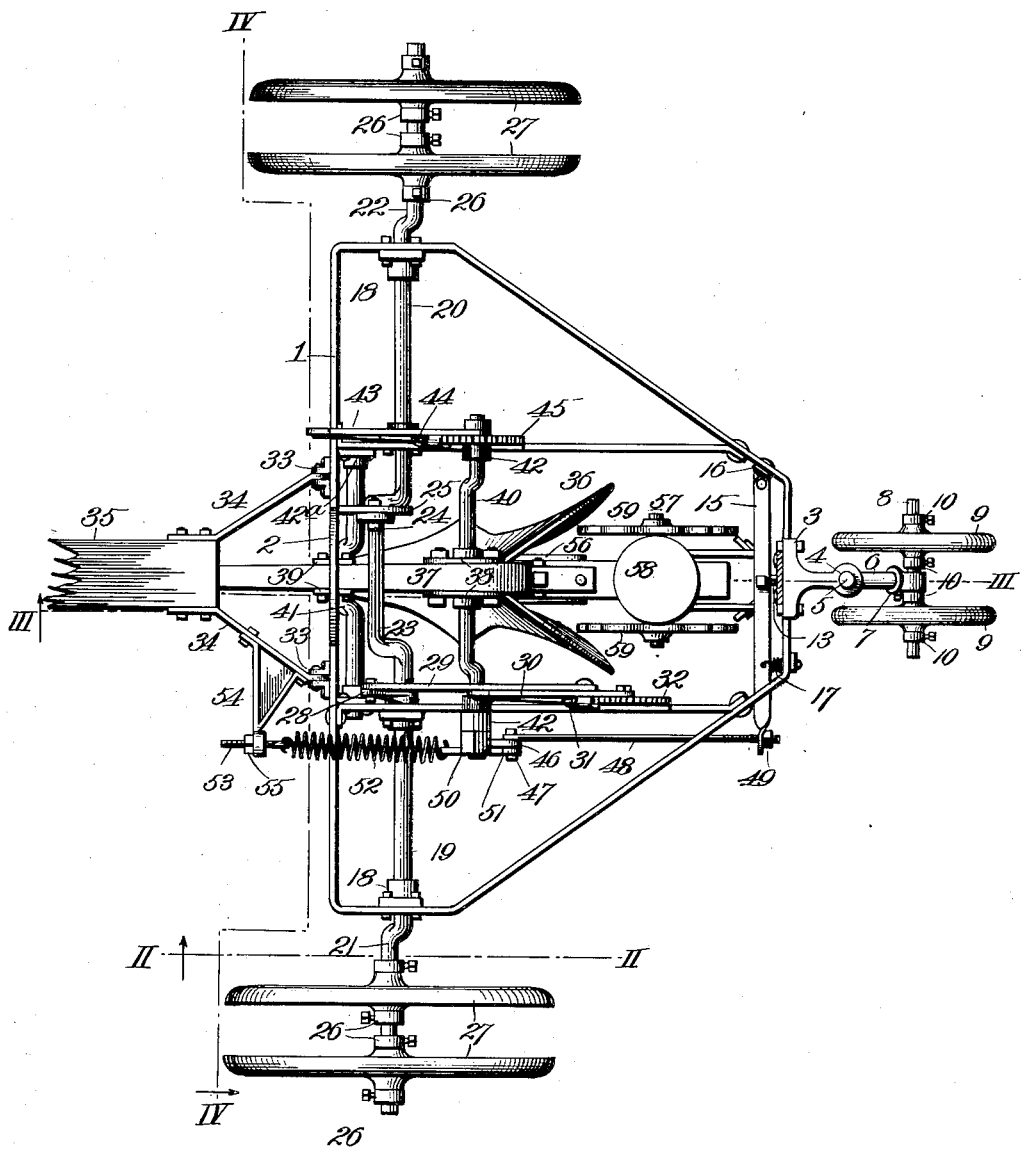
Figure 2:
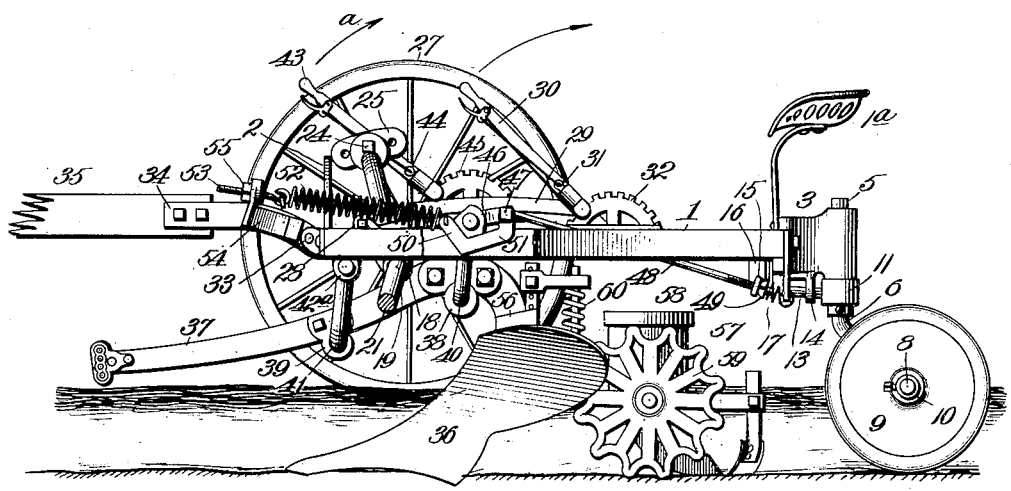
Figure 3:
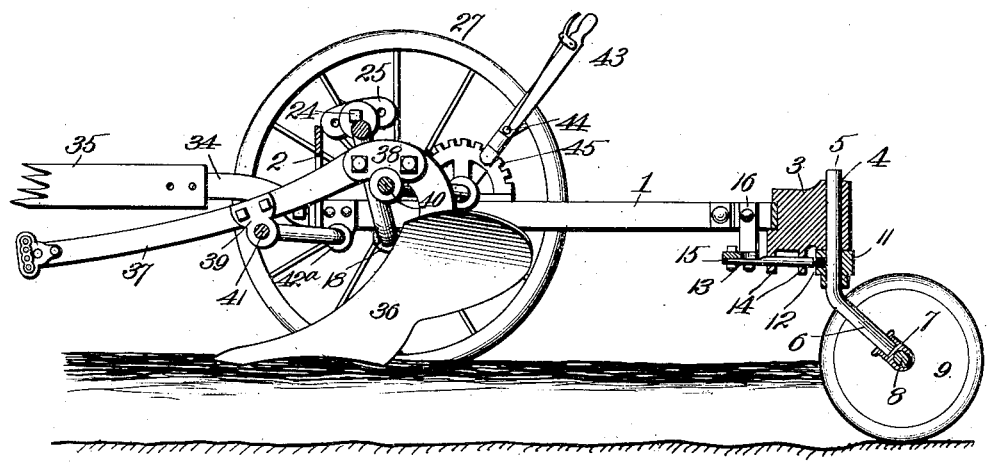

Figure 1, is a top plan view of a combined lister plow and planter embodying our invention. Fig. 2, is a vertical section taken on the line II—II of Fig. 1. Fig. 3, is a vertical section taken on the line III—III of Fig. 1, but showing the plow raised instead of lowered as in Fig. 2, and omitting the planter mechanism shown in Figs. 1 and 2. Fig. 4, is a vertical section on the line IV—IV of Fig. 1. Fig. 5, is a view similar to Fig. 2, with the plow raised. Fig. 6, is a top plan view of a modified form of construction. Fig. 7, is a detail perspective view showing the relation between the frame of the machine and the lever carrying the pin for locking the caster against swivel movement.

In the said drawings, 1 designates a skeleton frame of approximately triangular outline when viewed in plan, said frame having its front portion or cross bar centrally arched as at 2.

3 is a casting secured rigidly to the rear or apex portion of the frame, in longitudinal alinement with the arch, and said casting is provided with a vertical passage 4, wherein is swiveled the stem 5, of the caster arm, the lower portion 6, of said caster arm extending at an angle to stem portion 5, and being rigidly secured at its lower end by a coupling 7 to the center of a short transverse shaft 8, and journaled upon said shaft at opposite sides of its center is a pair of wheels 9, which together constitute a double-tread caster wheel, the adjustable collars 10 also upon said shaft and flanking the wheels serving to determine the distance between the tread surfaces of said wheels, and in this connection it should be stated that the distance between said tread surfaces will be determined by the condition of the soil. In dry weather the wheels will be closer together than in wet, when the soil is sticky.

Secured rigidly upon the stem portion 5 of the caster arm is a collar 11, which forms a support for the rear portion of frame 1, and is provided with a socket 12, disposed forwardly and longitudinally of the machine when shaft 8 extends at right angles thereto, so as to receive the end of the locking-pin 13, mounted to reciprocate longitudinally in the guide-lugs 14, depending from casting 3. At its front end the locking pin is pivotally connected to a lever 15, pivoted at its right-hand end (when viewed from the rear of the machine) to a bracket 16 depending from the frame 1, and adapted for operation in a horizontal plane, a retractile spring 17 connecting the lever with the rear portion of the frame to hold the locking pin rearward with a yielding pressure.

Secured rigidly to and preferably depending from the side portions of the frame contiguous to the arched cross bar 2, are bearings 18 and journaled in said bearings, is an axle having an arched central portion and cranked ends, the ends extending at an angle to each other and the arch which must always stand upward. This axle, by preference, consists of a section 19, and a section 20, the outer end of section 19 terminating in a crank 21 and the outer end of section 20 in a crank 22, which cranks, by preference, will stand at about an angle of ninety degrees to each other, though not shown at that angle in the accompanying drawings.

The proximate ends of the axle sections 19 and 20, are cranked to form the arch 23, hereinbefore mentioned, a bolt 24 carried by one section being adapted to engage one of a series of perforations in the flattened portion 25 of the other section, said series of perforations extending concentrically of the axis of the shaft. It will thus be seen that this rigid axle can be adjusted to dispose its cranks 21 and 22 at varying angles to each other so as to increase or decrease the leveling power. The chief purpose however, of the arch 23 in said crank shaft, is to provide space for the raising and lowering of the plow and thereby permit of the use of smaller carrying-wheels than could otherwise be employed, the smaller and widely spaced carrying-wheels having the advantage over large ones of lowering the machine to such an extent that it cannot upset and of retaining their positions in the furrow more reliably. The cranks are provided with double-tread wheel-supports, and for purposes of adjustment each wheel-support preferably consists of a pair of carrying wheels 27, each held against lateral movement on its crank by a pair of collars 26, and in this connection it should be stated that the distance between the tread surfaces of each wheel support is about equal to the width of the bottom of the furrow, and it should also be understood that the wheel supports of the cranks are at equal distances from the longitudinal center of the machine, and furthermore that the distance between the longitudinal center of the machine and the center of the space between the wheel supports is the distance from center to center of the furrows, as hereinbefore referred to.

28 designates a crank arm projecting upward from the cranked axle, and 29 a link pivotally connecting said crank arm 28 with a lever 30 suitably fulcrumed upon the frame and provided with the usual dog 31 for engagement with a sector 32, also mounted rigidly on the frame. By means of this lever mechanism the driver is enabled to rotate the axle so as to reverse the positions of the cranks 21 and 22 and thereby permit the machine in operation to traverse the field from one side to the other and back again, in parallel lines, as hereinafter more particularly referred to.

33 designates brackets bolted or riveted to cross bar 1 of the frame at equal distances from its center, and pivoted to said brackets for movement in a vertical plane, are the hounds 34, secured to the rear end of the tongue 35, to which the draft animals are adapted to be attached in the usual or any preferred manner.

36 designates a lister plow having the usual beam 37, and provided by preference with two bearing brackets 38 and 39, for the depending bails 40 and 41 respectively, the axial arms of bail 40 being journaled in bearings 42 secured to and projecting upwardly from frame 1, and the axial arms of bail 41 being journaled in bearings 42ª depending from the frame. The bails are preferably of the same dimensions so that they shall rise and fall the same distance and at the same speed and therefore lift and lower the plow without tilting it forward or backward. In this connection it is to be understood that, while we prefer the use of a pair of bails, we reserve the right to employ only one bail, as under some conditions a single bail will be found preferable.

Secured upon the right hand end of bail 40, when looking forward, is a lever 43, equipped with the usual dog 44 for engagement with a sector 45, rigid with frame 1. Projecting rearward from the opposite end of said bail is a crank arm 46, and carried by the same is a pivot 47, which is pivotally engaged by the front end of a rod 48, having its rear end threaded and extending loosely through lever 15, and engaged at the rear side of the same by the nut 49. By this arrangement it will be apparent that the manipulation of lever 43 operates bail 40 for the purpose of raising the plow, and incidentally withdraws the locking pin 13 from the socket of collar 11, and thereby leaves the caster free for swivel operation in order to facilitate turning movement of the machine when at the ends of the rows or when traveling to or from the field. It is likewise obvious that when the plow is lowered, the spring 17 holds the locking pin with a yielding pressure against the collar 11, so that when the caster wheel swings to the position described, in line with the plow and therefore disposes the socket 12 to the front, said pin will immediately snap into said socket and lock the caster rigidly with relation to the plow. The rigidity thus obtained steadies the lister and prevents wabbling, and therefore insures the making of symmetrical or smooth even furrows, it being understood that the caster wheel members travel in the furrow made by the plow and are prepared to engage a portion of the side walls of the furrow and therefore provide a leverage against lateral vibratory movement of the plow.

An angle link comprises a portion, preferably of obtuse angle form as at 50, and an arm 51, which projects upwardly from the rear end of the obtuse angle portion and is pivotally mounted on bolt 47, the front end of the obtuse angle portion being connected to a retractile spring 52, connected at its front end to a bolt 53 extending loosely through a rigid bracket 54 projecting laterally from the contiguous hound 34, a nut 55 bearing against the front side of said bracket being adjustable upon bolt 53 for the purpose of varying the tension of the spring. When the plow is in the ground its tendency is to remain there under the retractile force of spring 52, because the front end of the latter and bolt 47 occupy a higher plane than the axis of the bail 40, the bail being likewise prevented from turning further so as to embed the plow deeper, because the inner angle of the obtuse angle portion of the angle link is pressing heavily upward against the opposing flat portion of crank arm 46, as shown clearly in Fig. 2. When the plow is raised by swinging lever 43 in the direction indicated by the arrow *a*, Fig. 2, after first withdrawing its dog from engagement with sector 45, the first part of the movement is resisted by spring 52, the resistance of the spring, however, being almost immediately transformed into assistance in raising the plow, because as soon as the pivot 47 passes below the plane of bolt 53, and the axis of bail 40, said spring begins to retract and therefore assist in raising the plow, and as this action takes place, as hereinbefore explained, the caster is released in order that it may be free to assume the position which it would naturally swing to when the machine is turned.

56 designates plates secured to the plow beam and forming a suitable support for the planting mechanism 57, said planting mechanism embodying as essential features, a hopper 58 and wheels 59, the latter being adapted by engagement with the bottom of the furrow, to effect the discharge of the grain. In the drawing a spring 60 is also shown to hold the planting mechanism yieldingly depressed. It is to be understood however, that we do not restrict ourselves to any particular character of planting mechanism nor to any particular means or method of supporting it, other than it shall be disposed in line with and between the plow and caster.

By the manipulation of lever 30, as hereinbefore explained, the positions of the wheel supports are reversed and the necessity for the machine traveling with the same wheel support always depressed and occupying a furrow is avoided, as said supports may alternately be depressed and alternately travel in the last-made furrow. As a result the furrows will not only be made symmetrical, smooth and even, because of the relation of the lister plow and caster, but they will be made in almost absolute parallelism because the depressed wheel supports 27, will run in the furrow previously made, and coöperating with the plow and caster, will compel the former to turn its new furrow parallel with that in which said support is traveling, and, in view of the fact that said support not only bears against the opposite side walls of the furrow and is of comparatively small diameter, but also has its tread surfaces rounded where they engage with said walls, as shown, it is obvious that a driver would have to be absolutely negligent of his work before said wheel support could ride out of the furrow and therefore permit the plow to move at an angle to instead of parallel with said furrow. When the end of the row is reached, the operator simply raises the plow and may manipulate lever 30, until the wheel support axes are substantially alined. He then causes the team to turn the machine and drives in the opposite direction until his originally elevated wheel support is in line with the furrow last-made or has entered the same. He then manipulates lever 30 to depress said support and raise the companion support, and also manipulates lever 43 to lower the plow and permit the caster to become automatically locked with the plow, in the manner hereinbefore explained. When the plow is raised it will be noticed that its beam projects up into the arch 23 of the crank axle, but that it is possible to arrange the frame of the machine at such a height and to employ wheel supports 27 of such diameter that it will not be necessary to arch said axle, though the latter construction is preferred for the reasons hereinbefore stated. The high-frame construction is exemplified in the pending application of Andrew Shearer filed Oct. 9, 1903, Ser. No. 176,365, for patent on combined lister plow and planter.

To effect a variation of distance between rows, the wheel supports may be adjusted on the cranks 21 and 22, laterally of the machine, and secured at the desired points by the collars 26. This adjustment is desirable because wider rows are preferred in some sections of the country than in others.

In Fig. 6, in lieu of the continuous crank axle consisting of sections 19 and 20 rigidly connected together, we employ crank axles 19ª and 20ª equipped with collars 26 and wheel supports 27, the cranks being preferably set quartering to each other as shown. In this construction each crank axle is equipped with its respective lever 30ª and carries a catch mechanism 31ª for engagement with the sector 32ª. In some connections it may be preferable to have the crank axles separate as above described so that they can be operated independently of each other and at a distance which the driver deems most proper. In all other respects the type of construction shown in Fig. 6, is precisely the same as that shown by the other sheets of drawing.

From the above description it will be apparent that we have produced a combined lister plow and planter possessing the features of advantage enumerated as desirable and which obviously may be modified in various particulars without departing from the principle of construction involved.

Having thus described the invention what we claim as new and desire to secure by Letters-Patent, is:—

1. In a machine of the character described, a suitable frame, a transversely-arranged axle journaled thereon and provided at opposite sides of and equal distances from its center with cranks disposed at an angle to each other, a pair of carrying-wheels journaled on each of said cranks, means for turning the axle to raise one crank and depress the other without affecting the altitude of the frame or axle at a point midway between the cranks, a lister plow arranged longitudinally of and suspended from the frame midway between the said cranks and means to vary the elevation of the plow without affecting the position of the frame, axle or carrying-wheels.

2. In a machine of the character described, a suitable frame, a transversely-arranged axle journaled thereon and provided at opposite sides of and equal distances from its center with cranks disposed at an angle to each other, a pair of carrying-wheels journaled on each of said cranks, means for turning the axle to raise one crank and depress the other without affecting the altitude of the frame or axle at a point midway between the cranks, a lister plow arranged longitudinally of and suspended from the frame midway between the said cranks, means to vary the elevation of the plow without affecting the position of the frame, axle or carrying-wheels, and a caster supporting the frame rearward of and in longitudinal alinement with the plow.

3. The combination of the frame, cranked axle sections mounted thereon, a flattened portion at the inner end of one section having a series of perforations arranged concentrically with the axis of the axle, and a bolt carried by the inner end of the other section adapted to engage one of said perforations.

4. The combination of the frame, a plow, bails mounted on the frame and carrying the plow, a crank arm at one end of one of the bails, a spring between said crank arm and the front end of the frame, a caster swiveled on the frame in rear of the plow, a locking pin arranged to prevent lateral movement of the caster, and connections between said pin and the crank arm at the end of the plow-carrying bail.

5. The combination of the frame, a plow, bails journaled on the frame and carrying the plow, one of the bails having a crank arm at one end provided with a flattened portion, means for swinging said bail to raise or lower the plow, a coiled spring carried by the frame in advance of the said bail, and an angle link connecting the rear end of the said spring with the said crank arm and adapted to engage the flattened portion of the crank arm when the plow is raised.

In testimony whereof we affix our signatures, in the presence of two witnesses.

ANDREW SHEARER.
LINDEN KIRLIN.

Witnesses to A. Shearer's signature:
 OTIS V. LOHMULLER,
 M. M. HASKIN.
Witnesses to L. Kirlin's signature:
 H. C. RODGERS,
 G. Y. THORPE.